Nov. 30, 1965  F. B. PARKER  3,220,253
WEATHERVANE AND WIND VELOCITY INDICATOR
Filed July 16, 1963
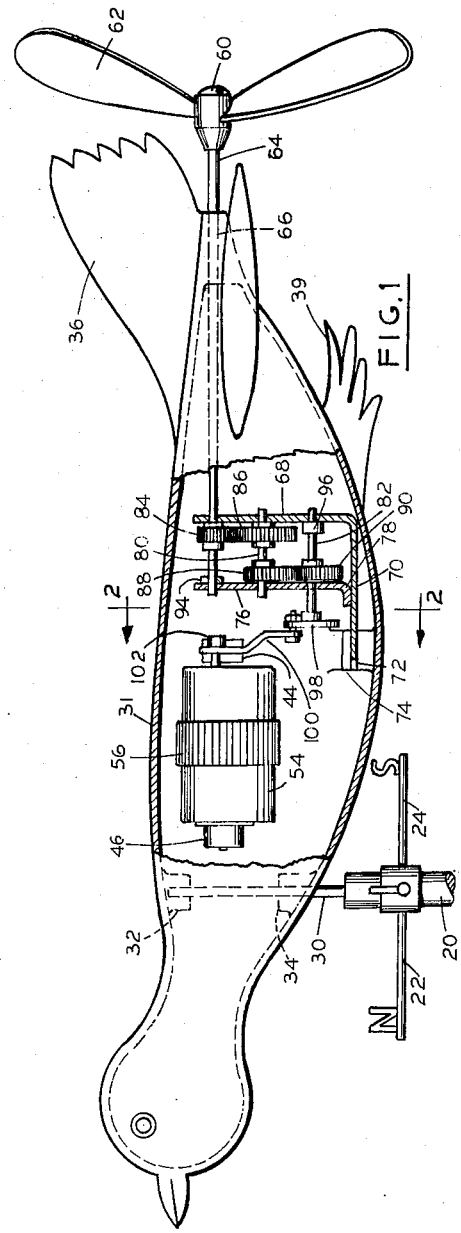
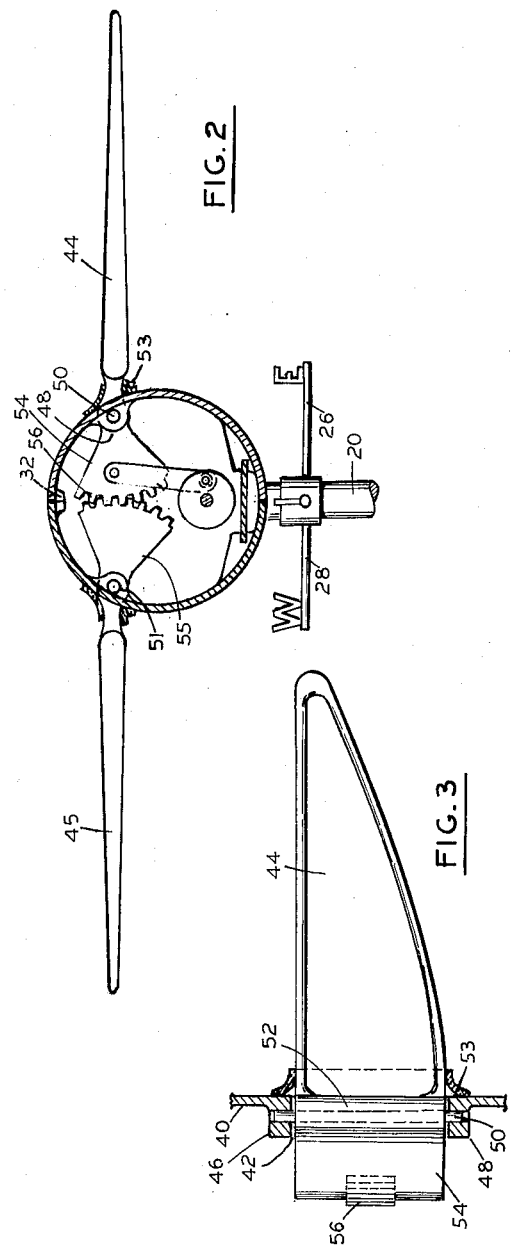
INVENTOR.
FRANK B PARKER
BY
ATTORNEY United States Patent Office 3,220,253
Patented Nov. 30, 1965

3,220,253
WEATHERVANE AND WIND VELOCITY
INDICATOR
Frank B. Parker, West Monroe, N.Y., assignor of one-half
to Howard P. Shaw, North Syracuse, N.Y.
Filed July 16, 1963, Ser. No. 295,419
1 Claim. (Cl. 73—189)

This invention relates to an animated weather vane, and wind velocity indicator.

More particularly the invention relates to a weather vane in the form of a large bird in a flight aspect, having wings which rise and fall in unison at a rate commensurate with the wind velocity. The invention further has to do with a driving mechanism for actuating the wings from the air stream which is of low cost construction, and which is effective to produce a low rate of movement of the wings from a wind actuated propeller that becomes practically invisible when driven by the wind stream. The invention further has to do with a weather vane construction of the type set forth wherein the wings are driven by a propeller located in the air stream such that the propeller drag assists in orienting the weather vane, the weather vane being in the form of a bird, in flight to indicate wind direction.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a side elevational view of the weather vane with a central portion shown in longitudinal section;

FIGURE 2 is a transverse sectional view taken substantially on the line 2—2 of FIGURE 1; and FIGURE 3 is a plan view of a wing with parts of its mounting in section.

Referring to the drawings, there is shown a staff 20 having directional arms 22, 24, 26 and 28 with letters to indicate North, South, East and West, and which may be permanently fixed and oriented to properly indicate direction. A vertical pivot pin 30 extends upwardly from the staff 20. Pivotally mounted on the pin 30 is the hollow body 31 of a bird which may be formed of die cast metal, plastic or the like as for example in two parts, dividing on a vertical longitudinal plane and secured together by any suitable means. The body is provided with internal upper and lower pivot bosses 32 and 34 disposed just behind the neck of the bird, the lower boss 34 having an aperture through which the pin 30 extends, and the boss 32 having a blind aperture to receive the pin and act as a thrust bearing. The rear of the bird body may be provided with a dorsal fin or vane 36 to aid in directing the bird so as to head into the wind. Spaced feet, one being indicated at 39, may extend from the lower side portions of the body.

The body portion of the bird is hollow, and each side section such as 40, is provided with a rectangular window 42, through which a light weight wing 44 projects, the shape and form of which may be varied, as will be understood by those skilled in the art. Adjacent the forward and rear ends of the window, on the inside thereof are projections 46 and 48 adapted to receive a trunnion pin 50 passing through a somewhat thickened region 52 of the wing.

Inboard of each wing is a heavy sector shaped counter balance portion 54 of a weight sufficient to balance the weight of the wing upon its pivot pin 50. The internal arcuate surface of the weight portion 54 is provided with sector gear teeth 56.

The two wings 44 and 45 are so pivoted on pins 50 and 51 that their respective sector gear teeth are enmeshed, and since each wing is counterbalanced by its weight portions 54 and 55, the wings will assume an outstretched position without any drooping tendency. A seal in the form of a rectangular frame, of freely flexible and somewhat elastic material adhesively attached to the body and surrounding the wing may be applied, as indicated at 53, to prevent the elements from entering the hollow body through the window.

In order to drive the wings so that they will rise and fall in a graceful manner in unison, a wind driven propeller 60 having blades 62 is provided at the rear of the bird. Such propeller is mounted on a propeller shaft 64, extending through a rump bearing 66 to a gear reduction bracket member 68, disposed internally of the hollow body of the bird. The shaft is disposed approximately at right angles to the pin 30. Such bracket member may be of L configuration and have a horizontal portion 70 nested and held in slots 72 formed in projections 74 in the internal lower side walls of the body portion of the bird. The bracket horizontal portion may have a second bracket 76 affixed thereto as at 78 and provide additional pivots for the shafts 80 and 82 of a reduction gear chain, comprising propeller driven pinion 84 and jack shaft gear 86, and reduction pinion 88 and driven gear 90. The gear 86 and pinion 88 are affixed to the shaft 80, or may be integral, and the gear 90 is affixed to the shaft 82. Suitable collars 94 and 96 are provided to prevent end play, and the end of shaft 82 is provided with a crank 98, and a connecting rod 100 leading to a crank pin 102 located on the wing weight portion 54.

In practice the wing pivot pins may lie generally parallel with the propeller shaft. Assuming the body to be formed in two side sections, the wings may be first assembled in their respective side sections, and the side sections thereafter may be brought together about the reduction gear and propeller shaft, after attachment of the connecting rod to the crank pin. In order for the wings to rise and fall in a uniform manner and at a speed such that the periodicity of their motion may be observed, the propeller, and gear reduction will be so chosen that the propeller will rotate many times for each rise and fall of the wings, and the propeller will preferably rotate at a velocity in low wind speeds so as to be substantially obscured from vision, relatively narrow blades being preferable to attain this end. Thus as wind velocity varies, an observer, after experience may time the rate of rise and fall of the wings and thereby at once determine the approximate wind velocity, and also the direction thereof.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

A weathervane and wind velocity indicator in the form of a bird in horizontal flight, comprising a hollow birdlike body portion, having a neck portion and simulated head for indicating wind direction at one end, and a dorsal fin and simulated tail feathers and rump at the other, said body portion having opposed wing windows vertical pivot means for the body portion located in the body portion, and adjacent to the neck portion, a propeller shaft projecting rearwardly from the rump portion and disposed substantially at right angles to the pivot means, a narrow bladed propeller affixed to the propeller shaft at the end thereof rearwardly of dorsal fin and simulated tail feathers, a gear reduction unit disposed within the body portion, having a pivot for the other end of the propeller shaft, and driven thereby, a pair of wings extending from the body portion through the side windows therein and pivoted on axes parallel with the propeller shaft axis, the wing pivot axes being disposed slightly inwardly of the body portion side windows, said wings each having sector shaped counter balanced weights disposed within the hollow body inwardly of the respective wing pivots, and sector gear teeth formed thereon adapted to entermesh to cause the wings to rise and fall in unison, a crank driven by the speed reduction gearing, and a connecting rod connecting the crank with one of the counter balance weights, whereby on rotation of the propeller the wings are caused to rise and fall in unison in proportion to the velocity of rotation of the propeller.

References Cited by the Examiner

UNITED STATES PATENTS

| | | | |
|---|---|---|---|
| 1,442,290 | 1/1923 | Pallone | 46—124 X |
| 2,015,009 | 9/1935 | Erickson | 46—55 |
| 2,061,189 | 11/1936 | Dungan | 73—189 |
| 2,704,908 | 3/1955 | Lamkin | 46—55 X |

FOREIGN PATENTS

| | | |
|---|---|---|
| 706,265 | 3/1931 | France. |

RICHARD C. QUEISSER, *Primary Examiner.*

DAVID SCHONBERG, *Examiner.*